United States Patent
Qi et al.

(10) Patent No.: US 9,369,977 B2
(45) Date of Patent: Jun. 14, 2016

(54) METHODS AND ARRANGEMENTS FOR SYNCH FRAME TRANSMISSIONS

(71) Applicant: Intel Corporation, Santa Clara, CA (US)

(72) Inventors: Emily H. Qi, Camas, WA (US); Po-Kai Huang, Santa Clara, CA (US); Minyoung Park, Portland, OR (US)

(73) Assignee: Intel Corporation, Santa Clara, CA (US)

(*) Notice: Subject to any disclaimer, the term of this patent is extended or adjusted under 35 U.S.C. 154(b) by 6 days.

(21) Appl. No.: 13/931,919

(22) Filed: Jun. 29, 2013

(65) Prior Publication Data

US 2014/0153550 A1    Jun. 5, 2014

Related U.S. Application Data

(60) Provisional application No. 61/733,658, filed on Dec. 5, 2012.

(51) Int. Cl.
H04W 56/00    (2009.01)

(52) U.S. Cl.
CPC ............ *H04W 56/001* (2013.01); *H04W 56/00* (2013.01)

(58) Field of Classification Search
None
See application file for complete search history.

(56) References Cited

U.S. PATENT DOCUMENTS

| | | | |
|---|---|---|---|
| 5,652,822 A * | 7/1997 | Sugawara et al. | 386/210 |
| 5,722,412 A * | 3/1998 | Pflugrath et al. | 600/459 |
| 8,867,512 B2 * | 10/2014 | Li et al. | 370/338 |
| 2002/0064134 A1 * | 5/2002 | Lee et al. | 370/252 |
| 2002/0163933 A1 * | 11/2002 | Benveniste | 370/465 |
| 2011/0189972 A1 * | 8/2011 | Sato et al. | 455/404.1 |
| 2013/0194965 A1 * | 8/2013 | Vedantham et al. | 370/254 |
| 2014/0119357 A1 * | 5/2014 | Abraham et al. | 370/338 |

OTHER PUBLICATIONS

Y. Tseng, "Power-saving protocols for IEEE 802.11-based multi-hop ad hoc networks," Computer Networks 43, 2003, pp. 317-337.*

* cited by examiner

*Primary Examiner* — Hoon J Chung
*Assistant Examiner* — Zhensheng Zhang
(74) *Attorney, Agent, or Firm* — Schubert Law Group PLLC (57) ABSTRACT

Logic to manage synch frame transmissions in a synch network via helper stations (STAs) synched to the network. Logic may coordinate actions of helper STAs via a transmission window (TW) provided by a master clock STA. Logic may distribute synch frame transmissions within a TW via synch logic in the helper STAs. Logic in helper STAs of a synch network may determine discovery periods in which to transmit synch frames between synch frame transmissions by the master clock STA. Logic in helper STAs to determine a discovery period in which to transmit synch frames to share workload with the master clock STA and to extend the coverage area of the synch network. Logic of the master clock STA may establish a fixed TW based upon the number of helper STAs and a time constraint for discovering the synch network. Or logic of the master clock STA may establish a dynamic TW in which the master clock STA can adjust the TW based upon a number of synch frame transmissions during a TW.

12 Claims, 5 Drawing Sheets

METHODS AND ARRANGEMENTS FOR SYNCH FRAME TRANSMISSIONS

TECHNICAL FIELD

Embodiments are in the field of wireless communications. More particularly, embodiments are in the field of communications protocols between wireless transmitters and receivers for transmitting synch frames.

BACKGROUND

Wi-Fi has become a ubiquitous wireless accessing technique for the mobile devices, and this trend has led to the need for Wi-Fi enabled mobile devices to discover each other. To achieve this goal, a starting point is for the mobile devices in a neighborhood to agree on specific synchronization timing. With the synchronization timing, the discovery window can be defined such that stations (STAs) can awake in the discovery window to discover each other. The STAs that follow the same synch timing will form a synch network.

Currently, in order to let a new device follow the timing of an existing synch network, some devices in the synch network are required to attempt for the synch frame transmission at each discovery window. Further, to avoid congestion, a device will do random backoff before each synch frame transmission, and if a device overhears a synch frame transmission before the backoff period expires, it will not transmit the synch frame.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may enable a number of Wireless Fidelity (Wi-Fi) enabled devices to synch Peer-to-Peer connectivity to allow users to connect their devices to, e.g., share, show, print, and synchronize content. Some embodiments may manage synch frame transmissions in a synch network via helper stations (STAs) synched to the network. The helper STAs may coordinate via a transmission window (TW) provided by a master clock STA. The TW may represent the number of discovery periods during which the master clock STA does not transmit a synch frame. In several embodiments, synch logic in each of the helper STAs may distribute synch frame transmissions within a TW.

In several embodiments, communications devices designated as helper stations in a synch network may share the responsibilities of transmitting synch frames with a master clock station to maintain synchronization amongst the devices associated with the network. In many embodiments, one or more of the devices may be mobile devices and the network may be a peer-to-peer network. Mobile devices may operate off of battery power at least part of the time so embodiments may accommodate the battery powered devices by establishing a distribution of the task of transmitting synch frames. The distribution may allow multiple devices to awake for only some of the discovery periods rather than awaking for all discovery periods.

In some embodiments, the synch logic in a helper STA of a synch network may determine discovery periods in which to transmit synch frames between synch frame transmissions by the master clock STA to share workload with the master clock STA and to extend the coverage area of the synch network. For instance, a helper STA may listen to the synch frame transmission from the master clock STA to obtain the value of the TW. In many embodiments, the helper STA may not transmit a synch frame during the same discovery period in which the master clock STA transmits a synch frame. In such embodiments, if the TW has four discovery periods, the helper STA may determine a discovery period as being a period between period two and period four.

In some embodiments, the helper STAs may comprise synch logic to implement a randomized method of determining a discovery period during which to transmit a synch frame in the TW. After the helper STA obtains the value of TW, the helper STA may scan all discovery windows in a period TW to be aware of the existing helper STAs in the communication range. After the scan, if the synch logic allows the STA to transmit the sync frame, then the synch logic may randomly choose a discovery window in the range [2,n] to transmit the sync frame for the next period. The number 2 denotes that the available discovery window in the discovery period following the discovery period 1 in which the master clock STA transmits a synch frame. In some embodiments, the helper STA may perform the randomized method of determining a discovery period for every period TW and in some embodiments, the helper STA may perform the randomized method of determining a discovery period only once after receiving the value of TW or once after receiving each new value of TW.

In some embodiments, the helper STAs may comprise synch logic to implement a fixed order method of determining a discovery period during which to transmit a synch frame in the TW. A default sequence may be defined as ($\frac{1}{2}$, $\frac{3}{4}$, $\frac{1}{4}$, $\frac{5}{8}$, $\frac{7}{8}$, $\frac{1}{8}$, . . . ). In other embodiments, the default sequence may be defined with a different set of numbers or with functions. In one embodiment, the default sequence involves selection of the middle discovery period of the discovery periods during which synch frames are transmitted in the synch network to shorten the discovery time of the synch network. In other words, if, upon scanning the synch transmission for a synch network over a TW equal to 4, the synch logic may determine that the discovery periods available for helper STAs to transmit synch frames are discovery periods 2, 3, and 4. The scans by the synch logic may reveal that synch frames were not transmitted during discovery periods 2, 3, and 4 so the synch logic may determine that the helper STA will transmit a synch frame in the middle of the discovery periods at discovery period 3. On the other hand, if anther helper STA transmitted a synch packet at discovery period 3, the synch logic will determine if the priority is to transmit the synch frame in at 3 to extend the range for the master clock STA or to select a different discovery period in which to transmit the synch frame such as discovery period 2 or 4. In some embodiments, the helper STA will be selected as an STA to extend the range of the master clock STA and this setting may be available to the helper STA in memory of the helper STA. In other embodiments, the helper STA will be selected as an STA to assist the master clock STA in transmissions of synch frames and this setting may be available to the helper STA in memory of the helper STA. In still other embodiments, the synch logic may default to assist the master clock STA in transmissions of synch frames if not otherwise instructed or if the helper STA does not have an indication from the master clock STA or from a remote STA that the helper STA is extending the range of the master clock STA.

In many embodiments, from the default sequence, the helper STA may obtain a discovery window sequence by calculating n*I+1, where I is the element of the default sequence. Then, the helper STA may scan the discovery window in the order defined by the discovery window sequence. For example, when n=4, the discovery window sequence may be (3, 4, 2). When n=8, the discovery window sequence may be (5, 7, 3, 6, 8, 2, 4). If the helper STA does not hear a synch frame transmission, it will use the discovery window to transmit synch frame in the future period. If the helper STA hears the synch frame transmission, and the selection algorithm allows the STA to transmit the synch frame, it will scan the next discovery window in the sequence.

In some embodiments, when two helper STAs cannot hear each other, a hidden node problem may occur. The hidden node problem can be resolved by controlling the maximum number of helper STAs that do not hear each other. In other words, the synch logic of the master clock station may determine that there are an excessive number of helper stations for the number of discovery periods in the TW. For instance, if the TW is fixed at a maximum of four discovery periods, implementing 20 helper stations may cause an excessive number of synch transmissions during the four discovery periods. In further embodiments, if the master clock station determines that there are multiple synch frame transmissions during each discovery window during the TW, the synch logic of the master clock station may determine that the number of helper stations is excessive.

Another way to resolve the hidden node problem is to let the helper STA wait for a random backoff time before the synch frame transmission. This alleviates the possible hidden node collision. Note that since the hidden node area is usually in the center of the synch network, which is the area around the master clock STA, a STA in that area can still receive the timing information from the master clock STA.

It is also possible that some STAs may leave the synch network. In some embodiments, synch logic of a STA can occasionally scan the discovery window right before the discovery period determined by the synch logic for transmission of a synch frame in accordance with the default sequence or a sequence function. If no transmissions are overheard then the synch logic STA may change the discovery period for synch frame transmissions correspondingly.

In many embodiments, the synch logic may be implemented in each device in a synch network. The synch logic of the master clock station may establish an initial value of TW and, in several embodiments, a minimum value for TW. In some embodiments, the master clock station may be the station that has the clock with the largest time stamp value. In some embodiments, the value of TW may represent a number of discovery periods that a master clock station may wait between attempts to transmit synch frames. A device may awake from a power-save mode, for instance, at a discovery period. In some embodiments, the synch logic of the device may establish a backoff period, which is the time period during a discovery window of the discovery period during which the device will wait and monitor the medium for synch frames prior to transmitting a synch frame. In several embodiments, the backoff period may be randomly determined to be a time between the beginning and end of the discovery window.

In several embodiments, the synch logic of the master clock STA may establish a fixed TW based upon the number of helper STAs and a time constraint for discovering the synch network. In further embodiments, the synch logic of the master clock STA may determine a dynamic TW in which the master clock STA can adjust the TW based upon a number of synch frame transmissions during a TW.

If the helper STA detects a synch frame transmitted by another device in the synch network prior to the expiration of the backoff period, the helper STA may not transmit a synch frame and the synch logic may increase the value of TW. If the device does not detect a synch frame prior to the expiration of the backoff period, the device may transmit a synch frame and the synch logic may decrease the value of TW.

In some embodiments, the synch logic may determine the next discovery period during which the device may attempt to transmit a synch frame based upon the current value of TW. After the value of TW is increased or decreased, for instance, in some embodiments, the synch logic of the helper stations may determine the number of discovery periods before the next attempt to transmit a synch frame.

In several embodiments, the value of TWmin depends on the requirement of discovery time. If an operational constraint requires that new devices discover the synch network faster, the value of TWmin may be smaller such as one discovery period meaning that the master clock device may transmit a synch frame in every discovery window. If a new device does not need to discover the synch network faster, the value of TWmin can be larger.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/get-ieee802/download/802.11-2012.pdf).

Several embodiments comprise devices such as routers, switches, servers, workstations, netbooks, mobile devices (Laptop, Smart Phone, Tablet, and the like), as well as sensors, meters, controls, instruments, monitors, appliances, and the like.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
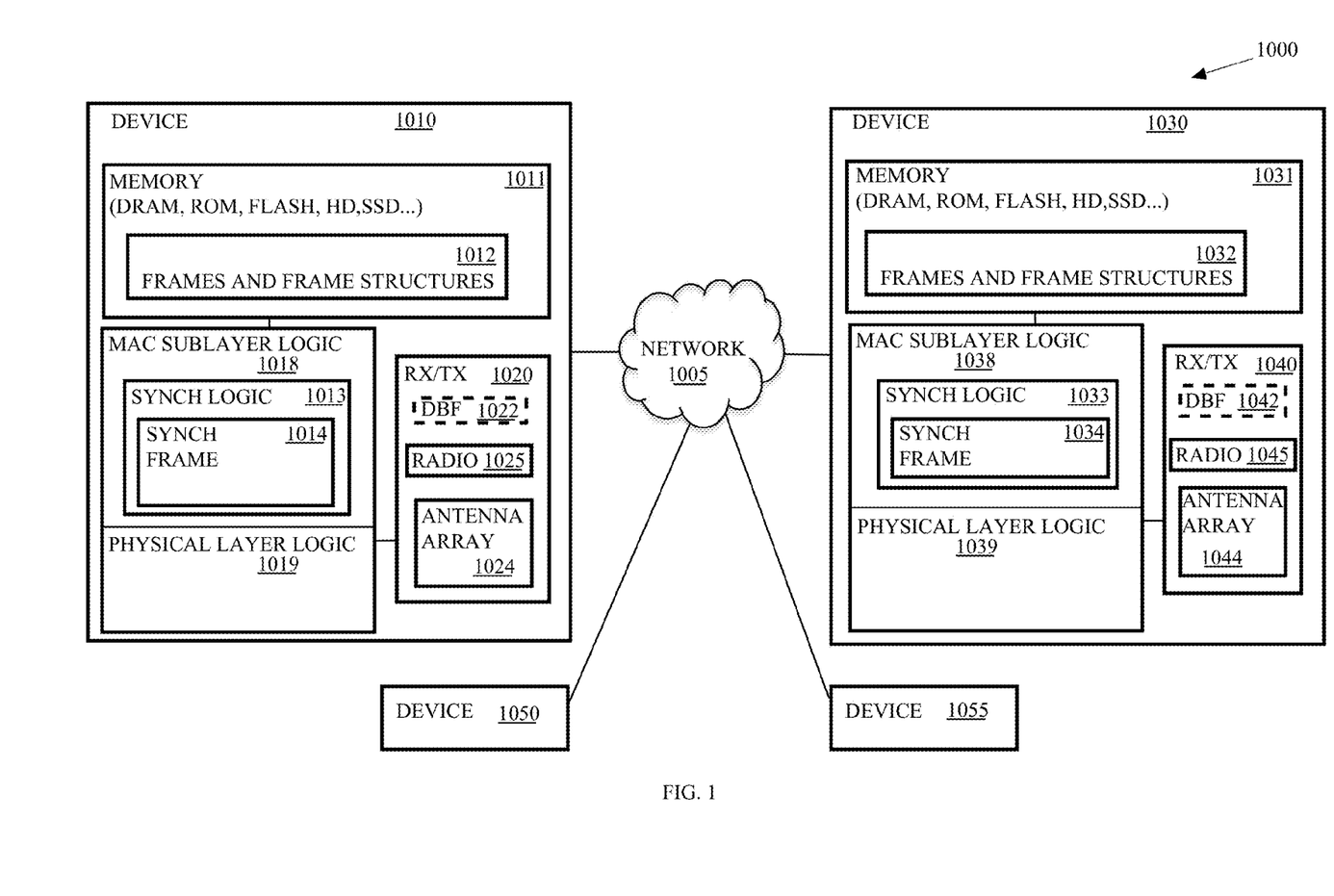
FIG. 1 depicts an embodiment of a wireless network comprising a plurality of communications devices.

Turning now to FIG. 1, there is shown an embodiment of a wireless communication system 1000. The wireless communication system 1000 comprises a communications device 1010 that may be wire line and wirelessly connected to a network 1005. In many embodiments, the network 1005 may represent a logical affiliation of the devices 1010, 1030, 1050, and 1055 in a synch network such as an association with a peer-to-peer (P2P) group. In other embodiments, the devices 1010, 1030, 1050, and 1055 may physically connect to a network infrastructure but have the capabilities of peer-to-peer communications.

The communications device 1010 may communicate wirelessly with a plurality of communication devices 1030, 1050, and 1055. The communications device 1010 may comprise a laptop. The communications device 1030 may comprise a low power communications device such as a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed.

Initially, the communications device 1010 may have the largest time stamp and may be designated as a master clock station (STA) as a result. The master clock station may comprise synch logic 1013 that determines a value of the transmission window (TW). The value of TW may be a fixed value in some embodiments and a dynamic value in further embodiments.

In many embodiments, the master clock STA may decide the period TW, which, in some embodiments, is equal to n*discovery period, wherein n is the number of discovery periods between which the master clock STA may not transmit synch frames. Between the discovery periods bounded by the TW, the helper STAs may be responsible to transmit synch frames to meet discovery-timing requirements for the synch network. The master clock STA will then transmit synch frames every TW.

Figure 1A:
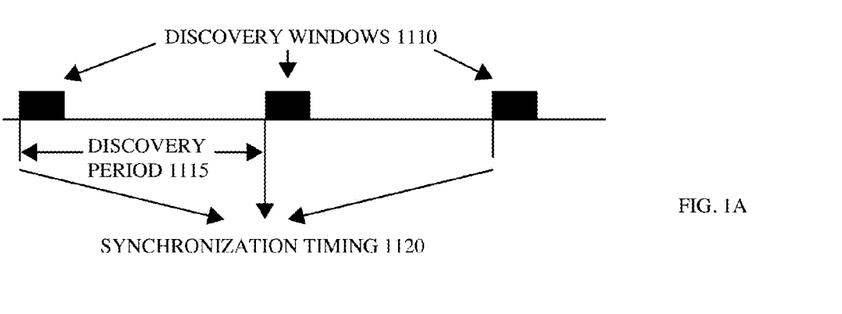
FIG. 1A depicts an embodiment of a discovery period with a discovery window to synchronize timing in peer-to-peer communications.

Referring also to FIG. 1A, there is show an example of synchronization timing 1120 for a synch network that includes discovery periods 1115 and discovery windows 1110. If, for example, the TW is two discovery periods long, the graph would illustrate a single TW and the master clock STA may transmit a synch frame within the first and last discovery window. Furthermore, a helper STA may transmit a synch frame at the middle discovery window to help the master clock station by half of the synch frame transmissions.

The communications device 1010, as the master clock station, may determine the value of TW as a fixed value. The synch logic 1013 may determine the fixed value of TW by the maximum number of helper STAs such as the communications device 1030 that may be employed to help the communications device 1010 with synch frame transmissions and a time constraint for discovering the synch network by communications devices such as the communications device 1055. For instance, the communications device 1055 may enter the vicinity of the synch network shortly after the master clock STA, the communications device 1010, transmitted a synch frame. If the communications device 1055 begins scanning for synch frames immediately after the communications device 1010 transmitted the synch frame and the TW is, e.g., 6 discovery periods, the communications device 1055 could wait up to six discovery periods or the TW before receiving a synch frame for the synch network if the synch network does not have any helper STAs that are transmitting synch frames during the discovery periods between transmissions of synch frames by the communications device 1010. Such a discovery time may exceed the time constraint for discovering the synch network. In some embodiments, the synch logic 1013 may authorize the addition of more helper STAs if the time constraint for discovering the synch network is exceeded.

In further embodiments, the synch logic 1013 may determine a dynamic value of the TW. For instance, the communications device 1010 may monitor the number of synch frame transmissions in the period occasionally to adjust the value of TW. If the number of synch frames transmitted during the TW is excessive, the synch logic 1013 of the communications device 1010 may increase the number of discovery periods in the TW or reduce the number of helper STAs tasked with assisting the master clock STA in transmitting synch frames 1013 for the synch network.

The helper STAs such as communications device 1030 may listen to the synch frame transmission from the master clock STA to obtain the value of the TW. Synch logic of helper STAs such as the synch logic 1033 of the communications device 1030 may also determine implement functionality to spread the transmission of helper STAs across the TW.

Figure 1B:
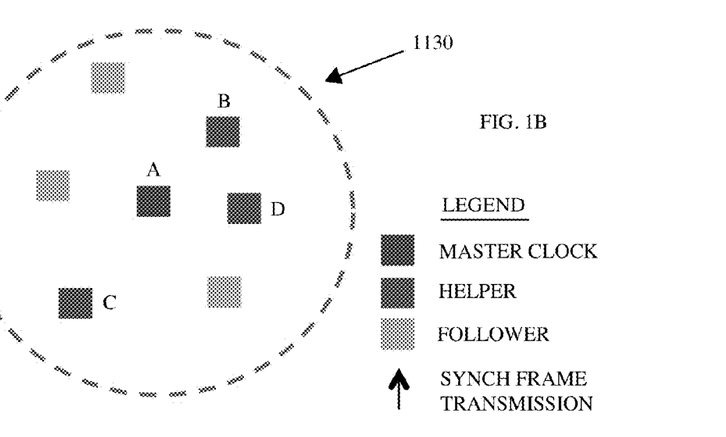
FIG. 1B depicts an embodiment of a neighborhood synch network of communications devices such as a master clock station, helper stations, and follower stations.

FIG. 1B illustrates an example of a neighborhood 1130 with a synch network. The box labeled "A" is the master clock STA. The boxes labeled "B", "C", and "D" are the helper STAs, and the remaining boxes in the neighborhood 1130 are follower STAs.

Figure 1C:
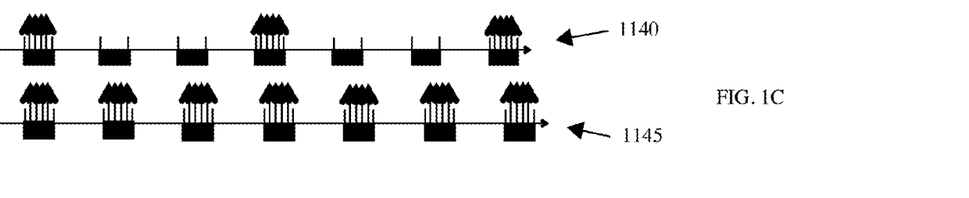
FIG. 1C depicts embodiments of the distributions of transmission of synch frames that fail to spread out over transmission windows or that are excessive in relation to the number of helper devices, the number of discovery periods in a transmission window, and/or the concentration of synch frames during a discovery window and during the transmission window.

The graph 1140 in FIG. 1C illustrates a timing diagram 1140 with arrows pointing up from the discovery windows to depict the transmission of synch frames. The timing diagram 1140 is an example of the problem in which the synch frames transmitted by the helper STAs all transmit during the same discovery window as the synch frame from the master clock station, the communications device 1010. The arrows point upward in the illustration from the discovery windows of the master clock STA. In many embodiments, the helper STAs are not allowed to transmit synch frames in the same discovery window as the master clock STA. This at least protects from collisions, the synch frame from the master clock STA so that stations such as the helper STAs and the follower STAs can receive at least the synch frame from the master clock STA every TW.

In some embodiments, when two helper STAs cannot hear each other, such as may be possible with helper STAs "B" and "C", a hidden node problem may occur. The hidden node problem may occur when the synch frames of two helper STAs collide. In some embodiments, the hidden node problem can be resolved by controlling the maximum number of helper STAs that do not hear each other. In other words, the synch logic 1013 of the master clock station, the communications device 1010, may determine that there are an excessive number of helper stations for the number of discovery periods in the TW. For instance, if the TW is fixed at a maximum of three discovery periods, implementing 20 helper stations may cause an excessive number of synch transmissions during the four discovery periods such as is illustrated in FIG. 1C on timing diagram 1145. The timing diagram 1145 illustrates the transmission of synch frames with arrows pointing up from the discovery windows. Note that multiple synch frames are attached to each of the discovery windows. In further embodiments, if the communications device 1010 determines that there are multiple synch frame transmissions during each discovery window during the TW as illustrated in timing diagram 1145, the synch logic 1013 of the communications device 1010 may determine that the number of helper stations is excessive.

The sync frames 1014, 1034 may be similar to beacon frames but may comprise shortened or may comprise less fields. In the present embodiment, the synch frame may comprise network identification for the synch network, the value of TW, as well as, in some embodiments, timing coordination to identify the synchronization timing 1120.

Figure 1D:
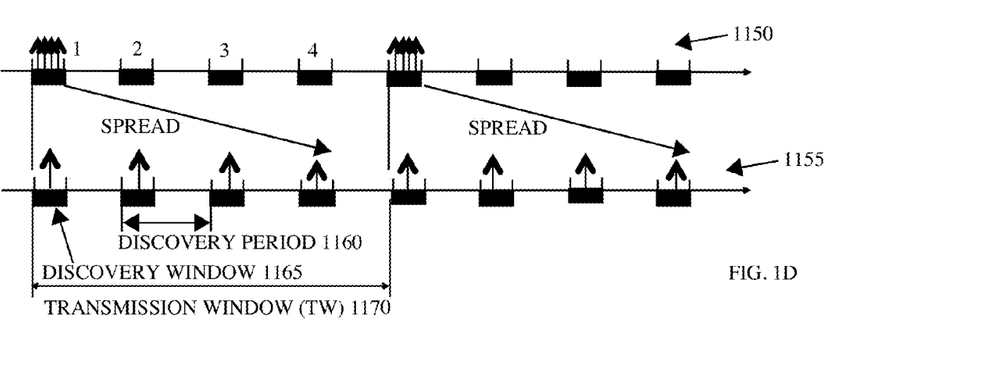
FIG. 1D depicts embodiments of a timing diagram prior to implementing the synch logic for the master clock STA, the communications device, and the synch logic for the helper STAs to spread synch transmissions amongst the discovery windows in the discovery periods over the TW.

FIG. 1D illustrates a timing diagram 1150 prior to implementing the synch logic 1013 for the master clock STA, the communications device 1013, and the synch logic 1033 for the helper STAs such as the communications device 1033 to spread synch transmissions amongst the discovery windows 1165 in the discovery periods 1060 over the TW 1170. An example of the results of timing of synch transmissions upon implementation of the synch logic 1013 and 1033 is illustrated in timing diagram 1155.

The helper STAs such as the communications device 1030 may awake from a power-save mode to an active mode prior to the start of the discovery window and the synch logic 1033 may optionally determine backoffs for the helper STAs. In many embodiments, the synch logic 1033 may determine the backoffs as a random time period that is within the bounds of the discovery window. The bounds of the discovery window 1110 may be predetermined per a specification or determined by a communications device 1010 and communicated to other devices of the synch network via the synch frames 1014 and stored in memory 1011 and 1031.

In several embodiments, the randomness of the generation of the backoffs cause the backoffs generated by the helper STAs to be different so that the backoff of, e.g., communications device 1050 expires prior to the expiration of the backoff of the communications device 1030. In several embodiments, if the backoff for the communications device 1050 expires and the communications device 1050 did not detect transmission of another synch frame 1034 within the backoff period, the communications device 1050 may proceed to transmit the synch frame such as synch frame 1014.

In some embodiments, the synch frames for helper STAs may relay or re-transmit information from the synch frame 1014 of the communications device 1010. In several embodiments, some helper STAs may transmit different sets of information than other helper STAs along with the basic information such as the synch network identification and synchronization timing. Furthermore, in some embodiments, the helper STAs are engaged in extending the synch network area to reach communications devices that are located far away from the master clock STA. For instance, a communications device may be within the range of helper "B" of FIG. 1B but not within the ranges of the other helper STAs "C" and "D". In some embodiments, a helper STA may extend the range of the synch network beyond the range of the master clock STA "A". In other embodiments, all the devices in the synch network are within the range of the master clock STA "A".

The helper STAs such as the communications device 1030 may comprise synch logic 1033 to implement a randomized method of determining a discovery period during which to transmit a synch frame 1033 in the TW. After the communications device 1030 obtains the value of TW, the communications device 1030 may monitor the communications medium during one or more discovery windows in a period TW to determine the number of the existing helper STAs in the communication range as well as the discovery periods within which they are transmitting synch frames.

After the monitoring the medium for one or more TWs, the synch logic 1033 may allow the STA to transmit the sync frame 1034, then the synch logic 1033 may randomly choose a discovery window in the range [TWmin,n] to transmit the sync frame 1034 during a subsequent TW. The number TWmin denotes the first available discovery window in which the communications device 1030 may transmit a synch frame 1034 and the number n may represent the number of discovery periods in the TW. In many embodiments, the TWmin is two, which indicates that the first available discovery window is the discovery window in the discovery period after the transmission of the synch frame 1013 by the communications device 1010. In other embodiments, the TWmin may be one, allowing the communications device 1030 to transmit in the same discovery window. In such embodiments, the communications device 1030 may transmit the synch frame 1034 after the transmission of the synch frame 1014. In other embodiments, the communications device may be out of the range of the targeted receivers of the synch frame 1014 transmitted by the communications device 1010.

In some embodiments, the communications device 1030 may perform the randomized method of determining a discovery period for every period TW and, in further embodiments, the communications device 1030 may perform the randomized method of determining a discovery period only once after receiving the value of TW or once after receiving each new value of TW.

In some embodiments, the communications device 1030 may comprise synch logic 1033 to implement a fixed order method of determining a discovery period during which to transmit a synch frame 1034 in the TW. In some of these embodiments, a default sequence may be defined as (½, ¾, ¼, ⅝, ⅞, ⅛, . . . ). In other embodiments, the default sequence may be defined with a different set of numbers or with functions and/or in different orders. In one embodiment, for instance, the default sequence involves selection of the middle discovery period of the discovery periods during which synch frames 1034 are transmitted in the synch network to shorten the discovery time of the synch network. In other words, if, upon scanning the synch transmission for a synch network over a TW equal to 4, as illustrated in timing diagram 1150 and 1155 in FIG. 1D, the synch logic 1033 may determine that the discovery periods available for the communications device 1030 to transmit synch frames are discovery periods 2, 3, and 4 as illustrated in timing diagram 1150 and 1155 in FIG. 1D. Scanning by the synch logic 1033 may reveal that synch frames such as synch frame 1034 were not transmitted during discovery periods 2, 3, and 4 so the synch logic 1033 may determine that the communications device 1030 will transmit a synch frame 1034 in the middle of the discovery periods at discovery period 3.

On the other hand, if another helper STA transmitted a synch frame at discovery period 3, the synch logic 1033 may determine whether to transmit the synch frame at discovery period 3 or to select a different discovery period. In still other embodiments, the synch logic may assist the communications device 1010 in transmissions of synch frames if not otherwise instructed.

In many embodiments, from the default sequence, the communications device 1030 may obtain a discovery window sequence by calculating n*I+1, where I is the element of the default sequence. Then, the communications device 1030 may scan the discovery window in the order defined by the discovery window sequence. If the communications device 1030 does not detect a synch frame transmission, the communications device 1030 may use the discovery window to transmit synch frame in the future period. If the communications device 1030 detects the synch frame transmission, the communications device 1030 may scan the next discovery window in the sequence.

The communications device 1030 may detect the transmission of the synch frame 1014 transmitted by the communications device 1010 during the backoff period of the communications device 1030 during the discovery window 1010. In several embodiments, the synch logic 1033 may determine to terminate the attempt to transmit a synch frame 1034 during the discovery window 1110 in response to detecting the transmission of another synch frame for the synch network.

The synch logic 1013 and 1033 may spread the synch frame transmissions by helper STAs without involving the master clock STA directly in the coordination of the sync frame transmissions. In many embodiments, each helper STA may determine their synch frame transmissions distributedly based on the TW of the master clock STA. Hence, the complexity of coordination is low. In addition, in several embodiments, the helper STAs may be aware of each other's synch frame transmissions. Hence, an existing selection algorithm may be utilized to control the number of helpers. In still further embodiments, the synch logic 1013 and 1033 may be general and simple enough such that it can work with the existing synchronization protocols.

The communication devices 1010 and 1030 comprise memory 1011 and 1031, and Media Access Control (MAC) sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or frame structures, or portions thereof such as a synch, beacon, device discovery request, device discovery response, service query, service response, permission request, and permission response frames.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. In the present embodiment, for instance, the MAC sublayer logic 1018, 1038 may comprise the synch logic 1013 and 1033 to generate synch frames 1014, 1034 and the data unit builders of the physical layer logic 1019, 1039 may prepend the frames with preambles to generate PPDUs for transmission via a physical layer device such as the transceivers (RX/TX) 1020 and 1040.

The communications devices 1010, 1030, 1050, and 1055 may each comprise a transceiver such as transceivers 1020 and 1040. Each transceiver 1020, 1040 comprises a radio 1025, 1045 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020, 1040 comprises a radio 1025, 1045 comprising an RF transmitter and an RF receiver. The RF transmitter comprises an OFDM module 1022, which impresses digital data, OFDM symbols encoded with tones, onto RF frequencies, also referred to as sub-carriers, for transmission of the data by electromagnetic radiation. In the present embodiment, the OFDM module 1022 may impress the digital data as OFDM symbols encoded with tones onto the sub-carriers to for transmission. The OFDM module 1022 may transform information signals into signals to be transmitted via the radio 1025, 1045 to elements of an antenna array 1024.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
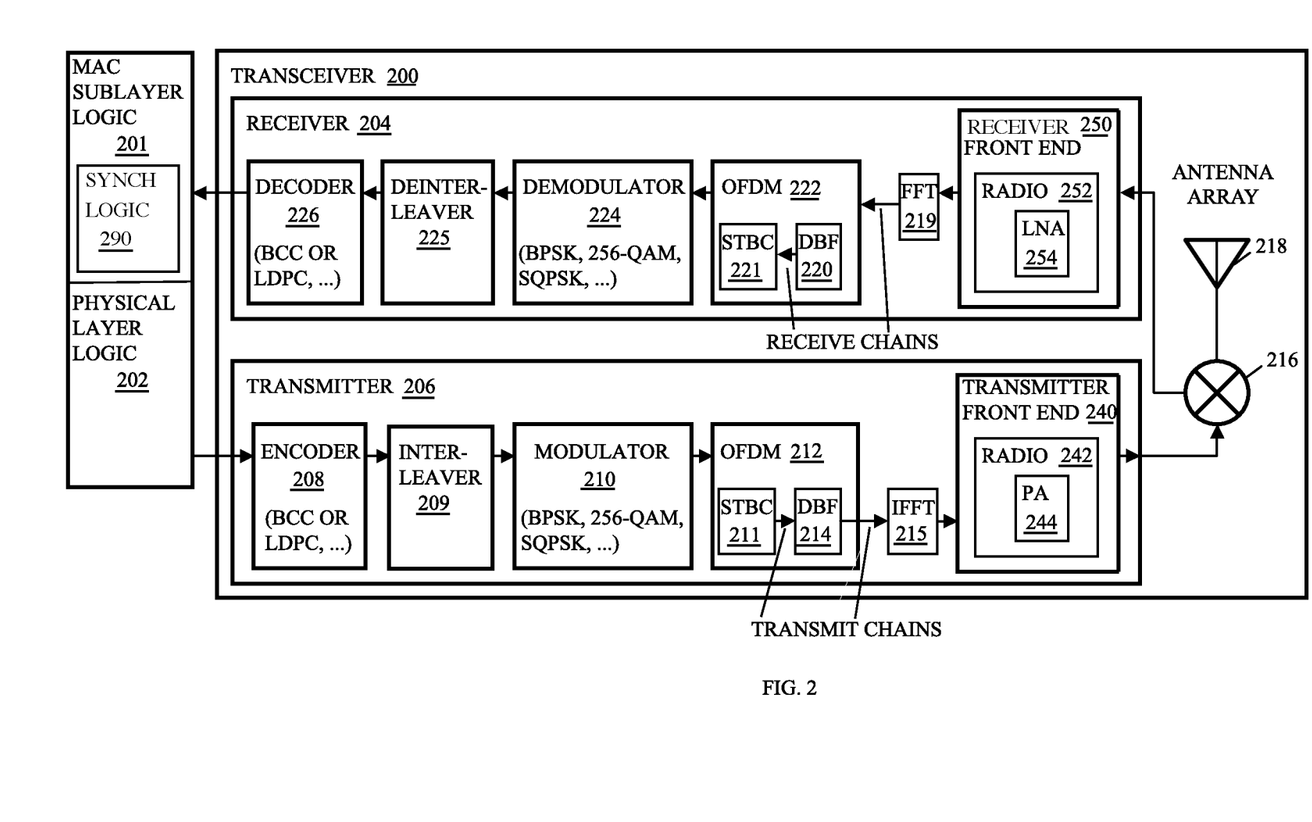
FIG. 2 depicts an embodiment of an apparatus to generate, transmit, receive and interpret synch frames for communications between wireless communication devices.

FIG. 2 depicts an embodiment of an apparatus to generate, transmit, receive, and interpret frames such as synch frames, beacon frames, device discovery request/response frames, permission request/response frames, synch frames, and other P2P related frames. The apparatus comprises a transceiver 200 coupled with Medium Access Control (MAC) sublayer logic 201. The MAC sublayer logic 201 may determine a frame and the physical layer (PHY) logic 250 may determine the PPDU by prepending the frame or multiple frames, MAC protocol data units (MPDUs), with a preamble to transmit via transceiver 200.

In many embodiments, the MAC sublayer logic 201 may comprise a frame builder to generate frames and a synch logic 290 such as the synch logic 1014 and 1034 described in conjunction with FIG. 1 to spread synch frame transmissions by the MAC sublayer logic 201 to distribute the synch frame transmissions based upon a randomized method of selection of discovery periods or a fixed order method of selection of discovery periods in which to transmit synch frames in a synch network. The PHY logic 250 may comprise a data unit builder 203. The data unit builder 203 may determine a preamble to prepend the MPDU or more than one MPDUs to generate a PPDU. In many embodiments, the data unit builder 203 may create the preamble based upon communications parameters chosen through interaction with a destination communications device. The preamble may comprise training sequences such a short training field (STF) and a long training field (LTF) to provide initial channel updates to the receiving device to allow the receiving device to update weight coefficients for a weighting function implemented by an equalizer in the receiving device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal sub-carriers so the OFDM symbols are encoded with the sub-carriers or tones. In some embodiments, the OFDM symbols are fed to the Digital Beam Forming (DBF) module 214. Generally, digital beam forming uses digital signal processing algorithms that operate on the signals received by, and transmitted from, an array of antenna elements.

The Inverse Fast Fourier Transform (IFFT) module 215 may perform an inverse discrete Fourier transform (IDFT) on the OFDM symbols. The output of the IFFT module 215 may enter the transmitter front end 240. The transmitter front end 240 may comprise a radio 242 with a power amplifier (PA) 244 to amplify the signal and prepare the signal for transmission via the antenna array 218. In some embodiments, the radio may not comprise a power amplifier 244 or may be capable of bypassing the power amplifier 244 if such amplification is unnecessary. The signal may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals such as synch frames transmitted by other stations. The receiver 204 may comprise a receiver front-end to detect the signal, detect the start of the packet, remove the carrier frequency, and amplify the subcarriers via a radio 252 with a low noise amplifier (LNA) 254. The communication signals may comprise, e.g., 32 tones on a 1 MHz carrier frequency. The receiver 204 may comprise a fast Fourier transform (FFT) module 219. The FFT module 219 may transform the communication signals from the time domain to the frequency domain.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated.

The OFDM module 222 may comprise a DBF module 220, and an STBC module 221. The received signals are fed from the equalizer to the DBF module 220 transforms N antenna signals into L information signals. And the STBC module 221 may transform the data streams from the space-time streams to spatial streams.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU based upon a format defined in the communications device for a frame to determine the particular type of frame by determining the type value and the subtype value. The MAC sublayer logic 201 may then parse and interpret the remainder of MPDU based upon the definition for the frame of the particular type and subtype indicated in the MAC header. For instance, if the frame is a management frame such as a synch frame, the frame body may include parameters to set for communication preferences for the source station of the transmission. Based upon the receipt of the synch frame, the synch logic 290 may determine to transmit a synch frame during a different discovery window or during the same discovery window but after the transmission of the synch frame.

Figure 3A:
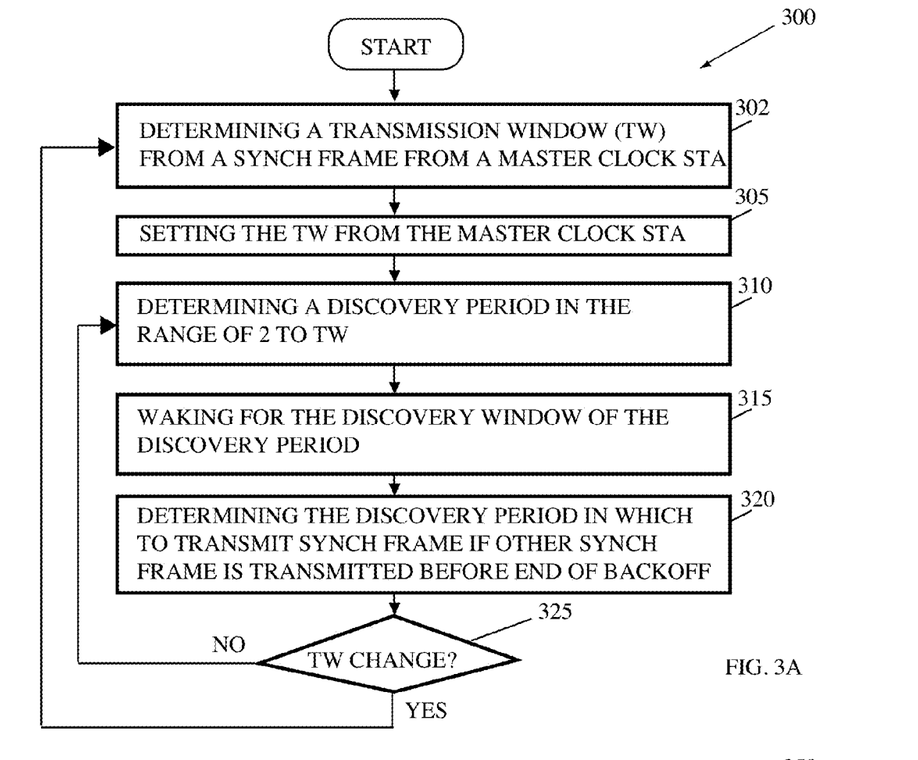
FIGS. 3A-B depict embodiments of flowcharts for synch logic to determine a transmission window and a subsequent discovery period in which to transmit a synch frame by a helper station and for synch logic to determine a new TW by a master clock station.

FIG. 3A illustrates an embodiment of a flowchart 300 to determine a transmission window and a subsequent discovery period in which to transmit a synch frame. The flowchart 300 begins with determining a transmission window (TW) from a master clock station (STA) (element 302). In many embodiments, the device may receive a synch frame or a beacon frame from the master clock STA that comprises a value for TW. Synch logic of the device may then set the value of TW from the master clock STA in memory of the device (element 305).

After setting the value of TW, the synch logic may determine a discovery period within which to transmit a synch frame (element 310). For instance, the synch logic may scan or monitor the wireless medium for a period TW to detect synch transmissions of previously joined synch network helpers, or helper STAs. The synch logic may determine the selection number by, e.g., determining a random discovery period bounded between a minimum TW such as the second discovery period and the current value of TW. In such embodiments, the random discovery period may represent a number of discovery periods and may be multiplied by the discovery period to determine an amount of time to wait before the next discovery period.

In further embodiments, the discovery period may be a number chosen via a predetermined or default sequence of numbers such as ($\frac{1}{2}$, $\frac{3}{4}$, $\frac{1}{4}$, $\frac{5}{8}$, $\frac{7}{8}$, $\frac{1}{8}$, ...). From the default sequence, the device may obtain a discovery period by calculating n*I+1, where I is the element of the default sequence. Then, the synch logic may scan the TW in the order defined by the default sequence. If the helper device does not detect a synch frame transmission at the first discovery period identified by the default sequence, the device may select that discovery period for transmitting the synch frame. However, if the device detects a synch transmission during that discovery period, the device may, in some embodiments, check the next discovery window in accordance with the default sequence or, in other embodiments, determine to transmit the synch frame in the current discovery window after the synch frame is transmitted by the other STA.

Once the synch logic determines the time period to the next discovery period to transmit a synch frame, the device may enter a power-save mode and awake at the discovery window of the discovery period (element 315). For instance, the device may be a low power device that operates on battery power so the device may preserve power by entering the power-save mode until just before the discovery period.

Upon awaking from the power-save mode, in some embodiments, the synch logic may determine a backoff period to wait during a discovery window of the discovery period prior to transmitting the synch frame. In many of such embodiments, the backoff period may be a random time period bounded within the discovery window of a discovery period.

In some embodiments, the device may then implement the backoff period to scan the medium for synch frame transmissions (element 320). If a synch frame is detected, the synch logic may determine to transmit the synch frame after the synch frame transmission by the other device terminates. In other embodiments, the device may determine to transmit the synch frame in the next discovery period in accordance with the default sequence.

At the beginning of the next TW period, the synch logic may check the synch frame from the master clock STA to determine if a new TW is included in the synch frame (element 325). If not, the device may either maintain the same discovery period for the next synch transmission or perform the same actions to determine the discovery period in which to transmit a synch frame beginning with element 310. On the other hand, if the device receives a new or updated value for the TW, the synch logic may repeat the process starting with determining the TW at element 302.

Figure 3B:
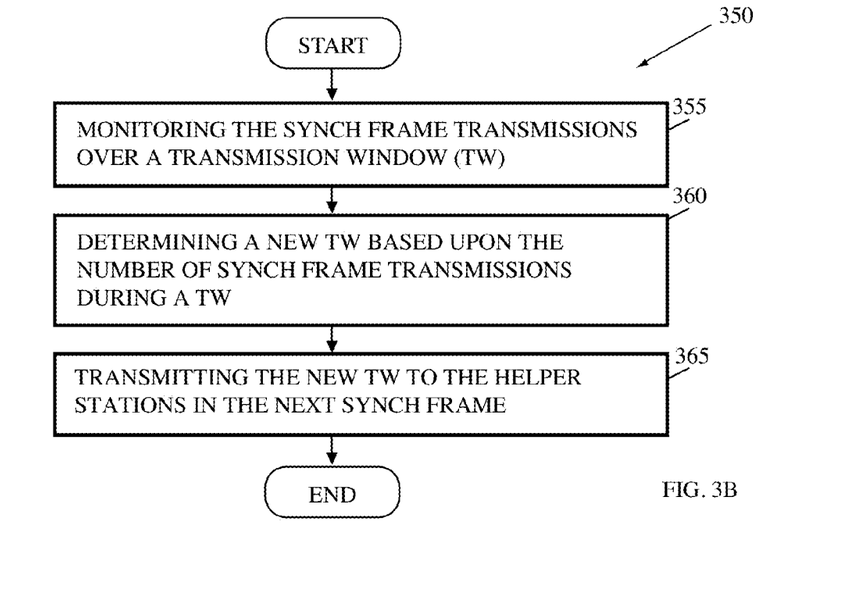

FIG. 3B illustrates an embodiment of a flowchart 350 for synch logic to determine a new TW by a master clock station. The flowchart 350 begins with monitoring the synch frame transmissions over a TW (element 355). In many embodiments, the master clock STA may receive one or more synch frames from one or more of the discovery periods between synch transmissions by the master clock STA.

Synch logic of the master clock STA may determine a new TW based upon the number of synch frame transmissions during a TW (element 360). For instance, the synch logic of the master STA may determine that there is an excessive number of helper STAs for the TW and increase the TW to accommodate the additional helper STAs. In further embodiments, the synch logic of the master clock STA may determine that there are not enough helper STAs to meet the discovery timing requirement and may decrease the TW to improve discovery timing.

After determining a new value of TW, the synch logic may insert the new TW in the next synch frame transmission by the master clock STA to transmit the new TW to the helper STAs (element 365). In other embodiments, the value of TW may be fixed and synch logic of the master clock STA may add more helper STAs or terminate the helper status of helper STAs to meet the discovery timing requirements and eliminate or attenuate excessive synch frame transmissions.

Figure 4A:
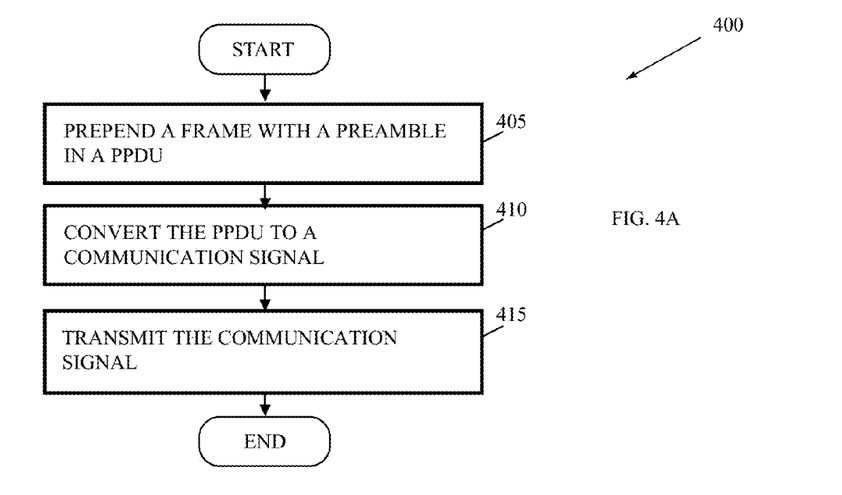
FIGS. 4A-B depicts embodiments of flowcharts to generate, transmit, receive and interpret synch frames for communications between wireless communication devices.
Figure 4B:
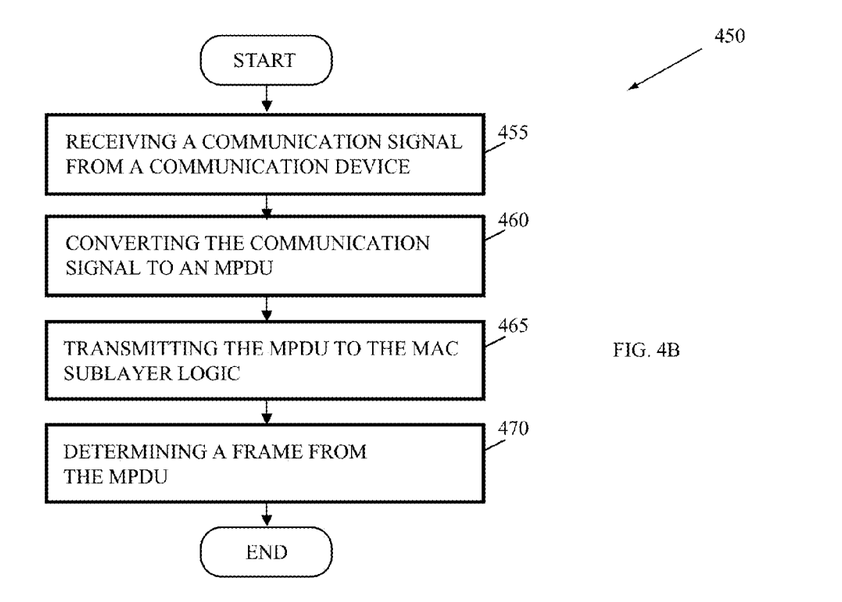

FIGS. 4A-B depict embodiments of flowcharts 400 and 450 to transmit, receive, and interpret communications with a frame. Referring to FIG. 4A, the flowchart 400 may begin with receiving a synch frame from the synch logic of the MAC sublayer logic. The MAC sublayer logic of the communications device may generate the frame as a management frame to transmit to other devices of a synch network and may pass the frame as an MAC protocol data unit (MPDU) to a PHY logic that transforms the data into a packet that can be transmitted to the access point. The PHY logic may generate a preamble to prepend the PHY service data unit (PSDU) (the MPDU from the frame builder) to form a PHY protocol data unit (PPDU) for transmission (element 405). In some embodiments, more than one MPDU may be included in a PPDU.

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of a device in a synch network such as the receiver 204 in FIG. 2 receiving a communication signal via one or more antenna(s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine frame field values from the MPDU (element 470) such as the management frame fields. For instance, the MAC sublayer logic may determine frame field values such as the type and subtype field values of the synch frame. Synch logic of the MAC sublayer logic may determine that the MPDU comprises a synch frame so the synch logic may determine to transmit a synch frame by the device in a subsequent discovery period based upon a default sequence of the discovery periods available to transmit the synch frame. In many embodiments, the synch logic may transmit the synch frame during the next discovery period.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for establishing application session based secure peer-to-peer links. It is understood that the form of the embodiments shown and described in the detailed description and the drawings are to be taken merely as examples. It is intended that the following claims be interpreted broadly to embrace all variations of the example embodiments disclosed.

Further embodiments may include a method comprising determining a transmission window from a first synch frame received from a master clock station; determining a discovery period in which to transmit a second synch frame based upon the transmission window, wherein the transmission window comprises a period of synch frame transmissions from the master clock station; and transmitting the second synch frame.

In some embodiments, the method may further comprise delaying transmission of the second synch frame during the discovery period if a third synch frame is received during a backoff period. In some embodiments, delaying transmission comprises delaying the transmission to a later time during the discovery period. In some embodiments, delaying transmission comprises transmitting the second synch frame in a subsequent discovery period. In some embodiments, determining the discovery period in which to transmit the second synch frame based upon the transmission window comprises determining the discovery period, wherein the discovery period occurs within the transmission window. In some embodiments, determining the discovery period in which to transmit the second synch frame based upon the transmission window comprises determining a random number bounded by 2 and the transmission window, wherein the random number is associated with the discovery period. In some embodiments, determining the discovery period in which to transmit the second synch frame based upon the transmission window comprises determining the discovery period based upon a default sequence. In some embodiments, determining the discovery period based upon a default sequence comprises determining a number of discovery periods within the transmission window, selecting a number from the default sequence, and multiplying the number of discovery periods within the transmission window with the number in the default sequence to determine the discovery period. In some embodiments, determining the discovery period based upon a default sequence further comprises adding one discovery period to the result of the multiplying to avoid discovery periods coinciding with transmission of the master synch frames. In some embodiments, determining the discovery period based upon a default sequence comprises determining the discovery period based upon a default sequence that comprises two or more numbers of the sequence ½, ¾, ¼, ⅝, ⅞, and ⅛. And in some embodiments, determining the discovery period in which to transmit the second synch frame based upon the transmission window comprises determining the discovery period to be in the middle of the transmission window or in the middle of synch transmissions within the transmission window.

Further embodiments may include a device comprising a memory; and a medium access control logic coupled with the memory to determine a transmission window from a first synch frame received from a master clock station; determine a discovery period in which to transmit a second synch frame based upon the transmission window, wherein the transmission window comprises a period of synch frame transmissions from the master clock station; and transmit the second synch frame.

In some embodiments, the device may further comprise a radio coupled with the medium access control logic to scan for another synch frame transmission during a backoff period in a discovery window of the discovery period. In some embodiments, the medium access control logic comprises logic to delay transmission of the second synch frame during the discovery period if a third synch frame is received during the backoff period. In some embodiments, the medium access control logic comprises logic to delay transmission comprises delaying the transmission to a later time during the discovery period. In some embodiments, the medium access control logic comprises logic to determine the discovery period in which to transmit the second synch frame based upon the transmission window comprises determining the discovery period, wherein the discovery period occurs within the transmission window. In some embodiments, the medium access control logic comprises logic to determine a random number bounded by 2 and the transmission window, wherein the random number is associated with the discovery period. In some embodiments, the medium access control logic comprises logic to determine the discovery period based upon a default sequence that comprises two or more numbers of the sequence ½, ¾, ¼, ⅝, ⅞, and ⅛. And in some embodiments, the medium access control logic comprises logic to determine the discovery period to be in the middle of the transmission window or in the middle of synch transmissions within the transmission window.

Further embodiments may include a system comprising a radio; and a medium access control logic coupled with the radio to determine a transmission window from a first synch frame received from a master clock station; determine a discovery period in which to transmit a second synch frame based upon the transmission window, wherein the transmission window comprises a period of synch frame transmissions from the master clock station; and transmit the second synch frame.

In some embodiments, the device may further comprise an antenna coupled with the radio to scan for another synch frame transmission during a backoff period in a discovery window of the discovery period. In some embodiments, the medium access control logic comprises logic to delay transmission of the second synch frame during the discovery period if a third synch frame is received during the backoff period. In some embodiments, the medium access control logic comprises logic to delay transmission comprises delaying the transmission to a later time during the discovery period. In some embodiments, the medium access control logic comprises logic to determine the discovery period in which to transmit the second synch frame based upon the transmission window comprises determining the discovery period, wherein the discovery period occurs within the transmission window. In some embodiments, the medium access control logic comprises logic to determine a random number bounded by 2 and the transmission window, wherein the random number is associated with the discovery period. In some embodiments, the medium access control logic comprises logic to determine the discovery period based upon a default sequence that comprises two or more numbers of the sequence ½, ¾, ¼, ⅝, ⅞, and ⅛. And in some embodiments, the medium access control logic comprises logic to determine the discovery period to be in the middle of the transmission window or in the middle of synch transmissions within the transmission window.

Further embodiments may include a method comprising monitoring synch frame transmissions over one or more transmission windows, wherein the transmission window describes a period of synch frame transmissions from the master clock station; determining a new transmission window based upon a number of synch frame transmissions received over the one or more transmission windows; and transmitting the new transmission window in a master synch frame.

In some embodiments, determining the new transmission window comprises increasing the transmission window in response to determining that the number of synch frame transmissions received over the one or more transmission windows exceeds a threshold. And in some embodiments, determining the new transmission window comprises decreasing the transmission window in response to determining that the number of synch frame transmissions received over the one or more transmission windows fails to reach a threshold.

Further embodiments may include a device comprising a memory; and a medium access control logic coupled with the memory to monitor synch frame transmissions over one or more transmission windows, wherein the transmission window describes a period of synch frame transmissions from the master clock station; determine a new transmission window based upon a number of synch frame transmissions received over the one or more transmission windows; and transmit the new transmission window in a master synch frame.

In some embodiments, the medium access control logic comprises logic to increase the transmission window in response to determining that the number of synch frame transmissions received over the one or more transmission windows exceeds a threshold. And in some embodiments, the medium access control logic comprises logic to decrease the transmission window in response to determining that the number of synch frame transmissions received over the one or more transmission windows fails to reach a threshold.

Further embodiments may include a system comprising a radio; and a medium access control logic coupled with the radio to monitor synch frame transmissions over one or more transmission windows, wherein the transmission window describes a period of synch frame transmissions from the master clock station; determine a new transmission window based upon a number of synch frame transmissions received over the one or more transmission windows; and transmit the new transmission window in a master synch frame.

In some embodiments, the medium access control logic comprises logic to increase the transmission window in response to determining that the number of synch frame transmissions received over the one or more transmission windows exceeds a threshold. And in some embodiments, the medium access control logic comprises logic to decrease the transmission window in response to determining that the number of synch frame transmissions received over the one or more transmission windows fails to reach a threshold.

Further embodiments may include a machine-accessible product comprising a medium containing instructions to mitigate collisions between transmissions of devices operating at different bandwidths on a primary frequency of operation, wherein execution of the instructions cause a machine to perform operations, the operations comprising determining a transmission window from a first synch frame received from a master clock station; determining a discovery period in which to transmit a second synch frame based upon the transmission window, wherein the transmission window comprises a period of synch frame transmissions from the master clock station; and transmitting the second synch frame.

In some embodiments, the operations further comprise delaying transmission of the second synch frame during the discovery period if a third synch frame is received during a backoff period. In some embodiments, delaying transmission comprises delaying the transmission to a later time during the discovery period. In some embodiments, delaying transmission comprises transmitting the second synch frame in a subsequent discovery period. In some embodiments, determining the discovery period in which to transmit the second synch frame based upon the transmission window comprises determining the discovery period, wherein the discovery period occurs within the transmission window. In some embodiments, determining the discovery period in which to transmit the second synch frame based upon the transmission window comprises determining a random number bounded by 2 and the transmission window, wherein the random number is associated with the discovery period. In some embodiments, determining the discovery period in which to transmit the second synch frame based upon the transmission window comprises determining the discovery period based upon a default sequence. In some embodiments, determining the discovery period based upon a default sequence comprises determining a number of discovery periods within the transmission window, selecting a number from the default sequence, and multiplying the number of discovery periods within the transmission window with the number in the default sequence to determine the discovery period. In some embodiments, determining the discovery period based upon a default sequence further comprises adding one discovery period to the result of the multiplying to avoid discovery periods coinciding with transmission of the master synch frames. In some embodiments, determining the discovery period based upon a default sequence comprises determining the discovery period based upon a default sequence that comprises two or more numbers of the sequence ½, ¾, ¼, ⅝, ⅞, and ⅛. And in some embodiments, determining the discovery period in which to transmit the second synch frame based upon the transmission window comprises determining the discovery period to be in the middle of the transmission window or in the middle of synch transmissions within the transmission window.

Further embodiments may include a machine-accessible product comprising a medium containing instructions to mitigate collisions between transmissions of devices operating at different bandwidths on a primary frequency of operation, wherein execution of the instructions cause a machine to perform operations, the operations comprising monitoring synch frame transmissions over one or more transmission windows, wherein the transmission window describes a period of synch frame transmissions from the master clock station; determining a new transmission window based upon a number of synch frame transmissions received over the one or more transmission windows; and transmitting the new transmission window in a master synch frame.

In some embodiments, determining the new transmission window comprises increasing the transmission window in response to determining that the number of synch frame transmissions received over the one or more transmission windows exceeds a threshold. And in some embodiments, determining the new transmission window comprises decreasing the transmission window in response to determining that the number of synch frame transmissions received over the one or more transmission windows fails to reach a threshold.

Further embodiments may include an apparatus comprising a means for determining a transmission window from a first synch frame received from a master clock station; a means for determining a discovery period in which to transmit a second synch frame based upon the transmission window, wherein the transmission window comprises a period of synch frame transmissions from the master clock station; and a means for transmitting the second synch frame.

In some embodiments, the apparatus may further comprise a means for delaying transmission of the second synch frame during the discovery period if a third synch frame is received during a backoff period. In some embodiments, the means for delaying transmission comprises a means for delaying the transmission to a later time during the discovery period. In some embodiments, the means for delaying transmission comprises a means for transmitting the second synch frame in a subsequent discovery period. In some embodiments, the means for determining the discovery period in which to transmit the second synch frame based upon the transmission window comprises a means for determining the discovery period, wherein the discovery period occurs within the transmission window. In some embodiments, the means for determining the discovery period in which to transmit the second synch frame based upon the transmission window comprises a means for determining a random number bounded by 2 and the transmission window, wherein the random number is associated with the discovery period. In some embodiments, the means for determining the discovery period in which to transmit the second synch frame based upon the transmission window comprises a means for determining the discovery period based upon a default sequence. In some embodiments, the means for determining the discovery period based upon a default sequence comprises a means for determining a number of discovery periods within the transmission window, selecting a number from the default sequence, and multiplying the number of discovery periods within the transmission window with the number in the default sequence to determine the discovery period. In some embodiments, the means for determining the discovery period based upon a default sequence further comprises a means for adding one discovery period to the result of the multiplying to avoid discovery periods coinciding with transmission of the master synch frames. In some embodiments, the means for determining the discovery period based upon a default sequence comprises a means for determining the discovery period based upon a default sequence that comprises two or more numbers of the sequence ½, ¾, ¼, ⅝, ⅞, and ⅛. And in some embodiments, the means for determining the discovery period in which to transmit the second synch frame based upon the transmission window comprises a means for determining the discovery period to be in the middle of the transmission window or in the middle of synch transmissions within the transmission window.

Further embodiments may include an apparatus comprising a means for monitoring synch frame transmissions over one or more transmission windows, wherein the transmission window describes a period of synch frame transmissions from the master clock station; a means for determining a new transmission window based upon a number of synch frame transmissions received over the one or more transmission windows; and a means for transmitting the new transmission window in a master synch frame.

In some embodiments, the means for determining the new transmission window comprises a means for increasing the transmission window in response to determining that the number of synch frame transmissions received over the one or more transmission windows exceeds a threshold. And in some embodiments, the means for determining the new transmission window comprises a means for decreasing the transmission window in response to determining that the number of synch frame transmissions received over the one or more transmission windows fails to reach a threshold.

What is claimed is:

1. A method comprising:
    determining a transmission window from a first synch frame received from a master clock station in a synch network, wherein discovery windows comprise a window of time during each discovery period within which a station can transmit a synch frame, and wherein discovery periods comprise a period of time between discovery windows;
    determining a discovery period in which to transmit a second synch frame based upon the transmission window, wherein the transmission window comprises a period of synch frame transmissions from the master clock station, the period of synch frame transmissions comprising two or more discovery periods, wherein determining the discovery period in which to transmit the second synch frame based upon the transmission window comprises determining the discovery period based upon a default sequence, wherein determining the discovery period based upon a default sequence comprises determining a number of discovery periods within the transmission window, selecting a number from the default sequence, and multiplying the number of discovery periods within the transmission window with the number in the default sequence to determine the discovery period; and
    transmitting the second synch frame during a discovery window within the discovery period.

2. The method of claim 1, further comprising delaying transmission of the second synch frame during the discovery period if a third synch frame is received during a backoff period.

3. The method of claim 1, wherein determining the discovery period in which to transmit the second synch frame based upon the transmission window comprises determining the discovery period, wherein the discovery period occurs within the transmission window.

4. The method of claim 1, wherein determining the discovery period based upon a default sequence further comprises adding one discovery period to the result of the multiplying to avoid discovery periods coinciding with transmission of the master synch frames.

5. The method of claim 1, wherein determining the discovery period based upon a default sequence comprises determining the discovery period based upon a default sequence that comprises two or more numbers of the sequence ½, ¾, ¼, ⅝, ⅞, and ⅛.

6. The method of claim 1, wherein determining the discovery period in which to transmit the second synch frame based upon the transmission window comprises determining the discovery period to be in the middle of the transmission window or in the middle of synch frame transmissions within the transmission window.

7. A device comprising:
a memory; and
a medium access control logic coupled with the memory to determine a transmission window from a first synch frame received from a master clock station in a synch network, wherein discovery windows comprise a window of time during each discovery period within which a station can transmit a synch frame, and wherein discovery periods comprise a period of time between discovery windows; determine a discovery period in which to transmit a second synch frame based upon the transmission window, wherein the transmission window comprises a period of synch frame transmissions from the master clock station, the period of synch frame transmissions comprising two or more discovery periods, wherein determination of the discovery period in which to transmit the second synch frame based upon the transmission window comprises determination of the discovery period based upon a default sequence, wherein determination of the discovery period based upon a default sequence comprises determination of a number of discovery periods within the transmission window, selection of a number from the default sequence, and multiplication of the number of discovery periods within the transmission window with the number in the default sequence to determine the discovery period; and transmit the second synch frame during a discovery window within the discovery period.

8. The device of claim 7, further comprising a radio coupled with the medium access control logic to scan for another synch frame transmission during a backoff period in a discovery window of the discovery period.

9. The device of claim 7, wherein the medium access control logic comprises logic to determine the discovery period to be in the middle of the transmission window or in the middle of synch transmissions within the transmission window.

10. A machine-accessible product comprising:
a non-transitory medium containing instructions to mitigate collisions between transmissions of devices operating at different bandwidths on a primary frequency of operation, wherein execution of the instructions cause a machine to perform operations, the operations comprising:
determining a transmission window from a first synch frame received from a master clock station in a synch network, wherein discovery windows comprise a window of time during each discovery period within which a station can transmit a synch frame, and wherein discovery periods comprise a period of time between discovery windows;
determining a discovery period in which to transmit a second synch frame based upon the transmission window, wherein the transmission window comprises a period of synch frame transmissions from the master clock station, the period of synch frame transmissions comprising two or more discovery periods, wherein determining the discovery period in which to transmit the second synch frame based upon the transmission window comprises determining the discovery period based upon a default sequence, wherein determining the discovery period based upon a default sequence comprises determining a number of discovery periods within the transmission window, selecting a number from the default sequence, and multiplying the number of discovery periods within the transmission window with the number in the default sequence to determine the discovery period; and
transmitting the second synch frame during a discovery window within the discovery period.

11. The machine-accessible product of claim 10, wherein the operations further comprise delaying transmission of the second synch frame during the discovery period if a third synch frame is received during a backoff period.

12. The machine-accessible product of claim 10, wherein determining the discovery period in which to transmit the second synch frame based upon the transmission window comprises determining the discovery period.

* * * * *